Figure 1:
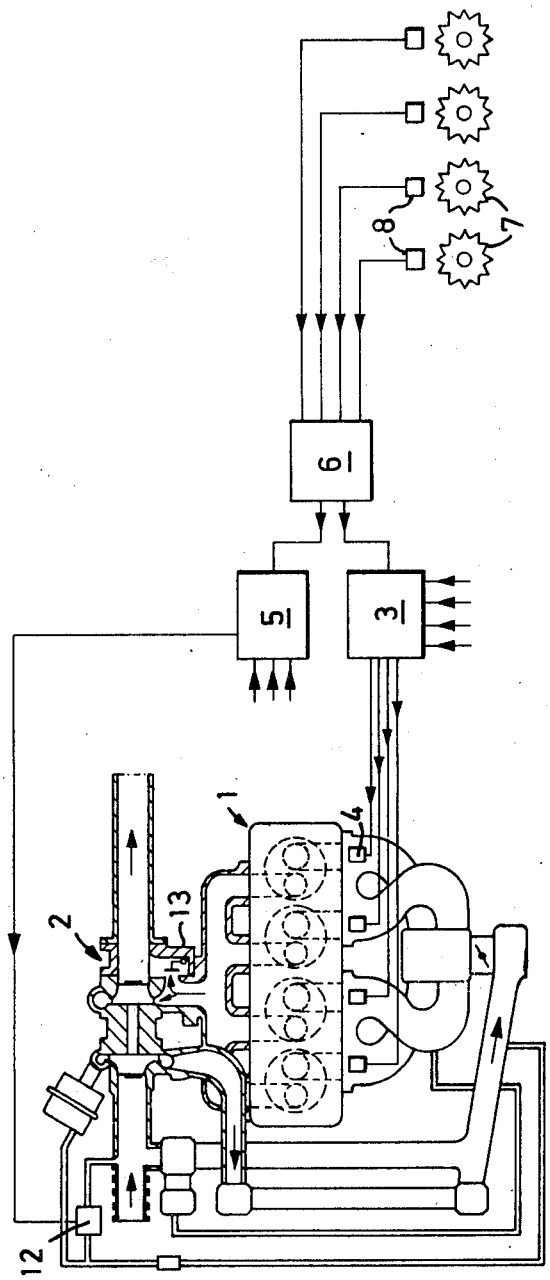

United States Patent [19]

Lind et al.

[11] 4,432,430
[45] Feb. 21, 1984

[54] WHEEL SPINNING CONTROL SYSTEM FOR MOTOR VEHICLES

[75] Inventors: Lars Lind, Floda; Kent Melin; Lars Sandberg, both of Gothenburg, all of Sweden

[73] Assignee: AB Volvo, Gothenburg, Sweden

[21] Appl. No.: 393,625

[22] Filed: Jun. 29, 1982

[30] Foreign Application Priority Data

Jun. 29, 1981 [SE] Sweden ............................. 8104064

[51] Int. Cl.³ ..................... B60K 31/00; F02D 5/02
[52] U.S. Cl. .............................. 180/197; 123/333; 123/481
[58] Field of Search ............... 180/197; 123/198 DB, 123/332, 333, 351, 478, 481

[56] References Cited

U.S. PATENT DOCUMENTS

| 3,776,355 | 12/1973 | Scherenberg | 180/197 |
| 3,802,529 | 4/1974 | Burckhardt et al. | 180/197 |
| 3,893,535 | 7/1975 | Burckhardt et al. | 180/197 |
| 3,938,611 | 2/1976 | Bertolasi | 180/197 |
| 3,941,203 | 3/1976 | Leconte | 180/197 |

FOREIGN PATENT DOCUMENTS 2095747 10/1982 United Kingdom .
2096698 10/1982 United Kingdom .
2096699 10/1982 United Kingdom .

Primary Examiner—Joseph F. Peters, Jr.
Assistant Examiner—Kenneth R. Rice
Attorney, Agent, or Firm—Young & Thompson

[57] ABSTRACT

The invention relates to a control system for preventing wheel spinning in the drive wheels of a motor vehicle with an engine with fuel injection. The control system has wheel speed sensing means and a processor unit which limits the quantity of fuel injected in steps in proportion to the wheel slippage. In a first step, the injected quantity is reduced to a cylinder by one half for example. In a second step, the fuel supply is completely shut off to this cylinder. The process then continues correspondingly by incremental shutting off of portions of cylinders until the wheel slippage drops, and the process is then reversed.

5 Claims, 2 Drawing Figures

WHEEL SPINNING CONTROL SYSTEM FOR MOTOR VEHICLES

The present invention relates to a control system for optimizing driven wheel traction and the capacity to take up lateral forces in a wheeled vehicle with a combustion engine which has a fuel injection system with injection valves, which comprises first speed sensor means for continuous sensing of the speed of the driven wheels of the vehicle, second speed sensor means for continuous sensing of the speed of the non-driven wheels of the vehicle, and a processing unit disposed to receive and compare speed-dependent signals sent by the first and second speed sensor means and upon detecting a speed difference to send a signal to a control unit to limit the injected quantity through the injection valves.

It is a known fact that the driven wheels easily spin on a slippery surface when the accelerator is depressed too rapidly, i.e. at high engine torque. The higher the engine torque is, the greater the risk of wheel spinning, making modern cars with powerful, often directly injected and turbo-charged engines especially susceptible, upon acceleration, to fish-tailing in rear wheel drive vehicles, or failure to turn in curves in front wheel drive vehicles.

Various systems have been suggested for automatically limiting engine torque when there is wheel slippage to establish sufficient traction and lateral force absorption regardless of how the driver presses the accelerator.

The systems comprise means which at an upper limiting value for wheel slippage either break the current to the engine ignition system or cut off the supply of fuel to the engine cylinders. Common to these systems is that the measure is taken at a single level and that all of the engine cylinders are affected. A system of the type described in the introduction, in which torque limitation for controlling wheel spin is effected in this manner, is described in U.S. Pat. No. 3,893,535 for example. In one embodiment it is suggested that the supply of fuel to all of the cylinders be completely discontinued by breaking the current to the electromagnetically controlled injection valves when the degree of wheel slippage exceeds 15%. When the wheel slippage has then dropped below this level, all of the injection valves are opened simultaneously, so that the entire fuel quantity determined by the accelerator is immediately supplied to all of the cylinders. This procedure however results in powerful oscillations about the selected value with resulting jerkiness in operation. The slipperier the road surface is, the more powerful the oscillation will be and the poorer the stability will be. There is thus the risk that during certain stages, the lateral force absorbing capacity will be insufficient to prevent fish-tailing for example when driving a rear wheel drive car in a curve.

The purpose of the present invention is to achieve a control system of the type described in the introduction which eliminates the above mentioned disadvantages by providing more exact control and thus less jerkiness in operation.

This is achieved according to the invention by disposing the processing unit to limit the injected quantity incrementally up to a level determined by the size of the speed differential between the driven and the non-driven wheels first having a speed differential, by sending a signal to the control unit to discontinue the injection through the respective valves one by one, first intermittently and then completely, so that a predetermined small speed differential results in intermittent discontinuation of the injection through only one injection valve, and a predetermined large speed differential results in complete discontinuation of the injection through a plurality of valves. In a preferred embodiment, the processing unit is an electronic unit disposed to send signals to an electronic control unit which controls the fuel injection through the injection valves.

The invention provides a control system which limits the engine torque incrementally up to the level determined by the wheel slippage. At a wheel slippage of 8% for example, as a first step, the injected quantity to one cylinder can be reduced by one half by intermittent closing of the associated injection valve. If this is not sufficient and the wheel slippage increases to 11% for example, this injection valve is closed completely. In this manner, the procedure is carried out in steps by shutting off portions of cylinders until the wheel slippage drops, and the procedure is reversed. The oscillations can thus be kept within a narrow range, determined by adding or subtracting a portion of a cylinder, which results in significantly smoother operation and better stability than what was previously possible with systems which discontinue fuel supply to all of the engine cylinders at a single level of wheel slippage.

The functional principle of the control system according to the invention makes the system easy to apply to cars with turbo-charged engines. In a preferred embodiment, the electronic processor unit is disposed at a predetermined lowest value of the speed differential, e.g. 5%, to send, as a first step, a signal to the electronic unit controlling the compressor boost pressure to discontinue the supercharging. In a turbo-charged engine with a feedback knock control system according to Swedish Patent Application No. 8101119-9, this can be done by having the electronic processor unit send a signal to the boost pressure-controlling unit which indicates excessive boost pressure. Such a solution, which involves simulating knocking in the engine, requires no modifications of the turbo control system whatsoever.

The invention is described below with reference to examples shown in the accompanying drawings.

Figure 2:
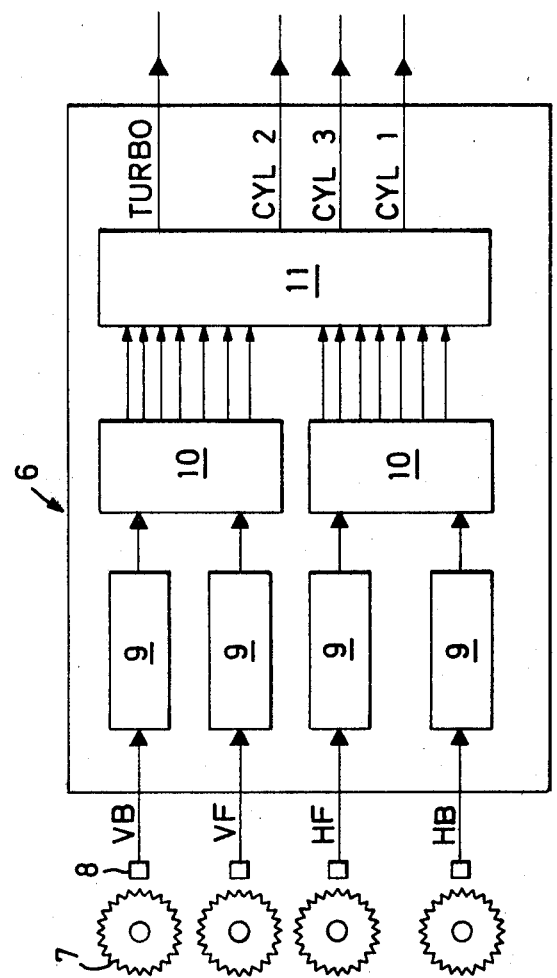

FIG. 1 shows a four-cylinder, turbo-charged engine with a wheel spin control system according to the invention, and FIG. 2 shows a block diagram of the electronic processing unit in an analogue version.

The engine 1 shown in FIG. 1 is provided with a turbo compressor installation 2. The engine has an electronic fuel injection system, for example the Bosch L-jetronic ®, with injection valves 4 controlled by an electronic control unit 3. The control unit 3, as well as an electronic control unit 5 for the turbo compressor, e.g. a microprocessor, are coupled to an electronic processing unit 6 in the wheel spin control system, to which processing unit information is fed concerning the speeds of the wheels. For this purpose, each wheel is provided with a sprocket wheel 7, which is coordinated with an inductive sensor 8, which provides an output signal which is an alternating current of a frequency proportional to the rotational speed of the sprocket wheel.

In the analogue version shown in FIG. 2, the processor unit 6 contains frequency/voltage converters 9, which convert the signals from the sensors 8 to direct current signals proportional to the respective wheel speeds. These signals VB and VF from the left rear and left front wheels, respectively, and HB, HF from the right rear and right front wheels, respectively, are fed pairwise into an individual comparator 10, which in turn sends a signal dependent on the speed differential to a logic circuit 11. The comparators in the embodiment shown here are disposed to send different signals at seven different levels or values of the detected speed differential, which results in signals to the control units 5 and 3 of the turbo compressor and of the injection system respectively, to effect one of seven different steps. The wheel which first indicates slippage at a certain level, thus triggers the step which is determined by this level. The levels and associated steps can be as listed below.

| Level | Step |
| --- | --- |
| 5% | Discontinue turbo-supercharging |
| 8% | Intermittent shut-off of cyl 2 fuel supply |
| 11% | Continuous shut-off of cyl 2 fuel supply |
| 14% | Intermittent shut-off of cyl 3 fuel supply |
| 17% | Continuous shut-off of cyl 3 fuel supply |
| 20% | Intermittent shut-off of cyl 1 fuel supply |
| 23% | Continuous shut-off of cyl 1 fuel supply |

Since the turbo compressor installation in the example shown has a so-called feed-back knock control, removal of the turbo supercharging can be effected simply by allowing the processor unit to simulate knocking, i.e. excessive boost pressure, and send signals to the microprocessor 5 to open the "waste gate" 13 by activating the solenoid valve 12 of the turbo.

Intermittent interruption of the fuel supply to the respective cylinder is achieved by allowing the processor unit 6 to send signals to the control unit 3 of the injection valves to feed the valves with a pulsating current. With opened and closed periods of equal length, the fuel quantities are reduced by half, which means that the engine torque after removal of the turbo supercharging, is reduced in steps by shutting-off one "half cylinder" at a time. Continuous shutting-off of the fuel supply to a cylinder is achieved by completely breaking the current to the injection valve.

In another embodiment not shown here, the processor unit 6 can be equipped with an additional comparator circuit, which compares the speeds of the vehicle front wheels to determine if there is a left hand or right hand curve and weights the comparison so that the lateral force absorbing capacity of the outer wheels is given priority over that of the inner wheels. Other ratios between the opened and closed periods are also possible, which results in finer control in shutting-off "half" cylinders.

In another embodiment not shown in more detail here, the processor unit is an electronic microprocessor.

What we claim is:

1. Control system for optimizing driven wheel traction and the capacity to take up lateral forces in a wheeled vehicle with a combustion engine which has a fuel injection system with injection valves, which comprises first speed sensor means for continuous sensing of the speed of the driven wheels of the vehicle, second speed sensor means for continuous sensing of the speed of the non-driven wheels of the vehicle, and a processing unit disposed to receive and compare speed-dependent signals sent by the first and second speed sensor means and upon detecting a speed difference to send a signal to a control unit to limit the injected quantity of fuel injected through the injection valves, characterized in that the processing unit is disposed to limit the injected quantity incrementally up to a level determined by the size of the speed differential between the driven and the non-driven wheels first having a speed differential, by sensing a signal to the control unit to discontinue the injection through the respective valves one by one, first intermittently and then completely, so that a predetermined small speed differential results in intermittent discontinuation of the injection through only one injection valve, and a predetermined large speed differential results in complete discontinuation of the injection through a plurality of valves.

2. Control system according to claim 1, characterized in that the processing unit is an electronic unit disposed to send signals to an electronic control unit which controls the fuel injection through the injection valves.

3. Control system according to claim 2 in a four-cylinder engine, characterized in that the electronic processing unit is disposed to limit the injected quantity in six steps, the first step involving intermittent closing of the injection valve to a first cylinder, the second step complete closing of this injection valve, and the subsequent four steps involving intermittent or complete closing of the injection valves of two additional cylinders.

4. Control system according to claim 2 or 3 in an engine supercharged by a turbo compressor, characterized in that the electronic processor unit is disposed, at a predetermined minimum value of the speed differential, to send, as a first step, a signal to the electronic unit controlling the compressor boost pressure to discontinue the supercharging.

5. Control system according to claim 4, characterized in that the electronic processing unit is disposed to send a signal indicating excessive boost pressure.

* * * * *